UNITED STATES PATENT OFFICE.

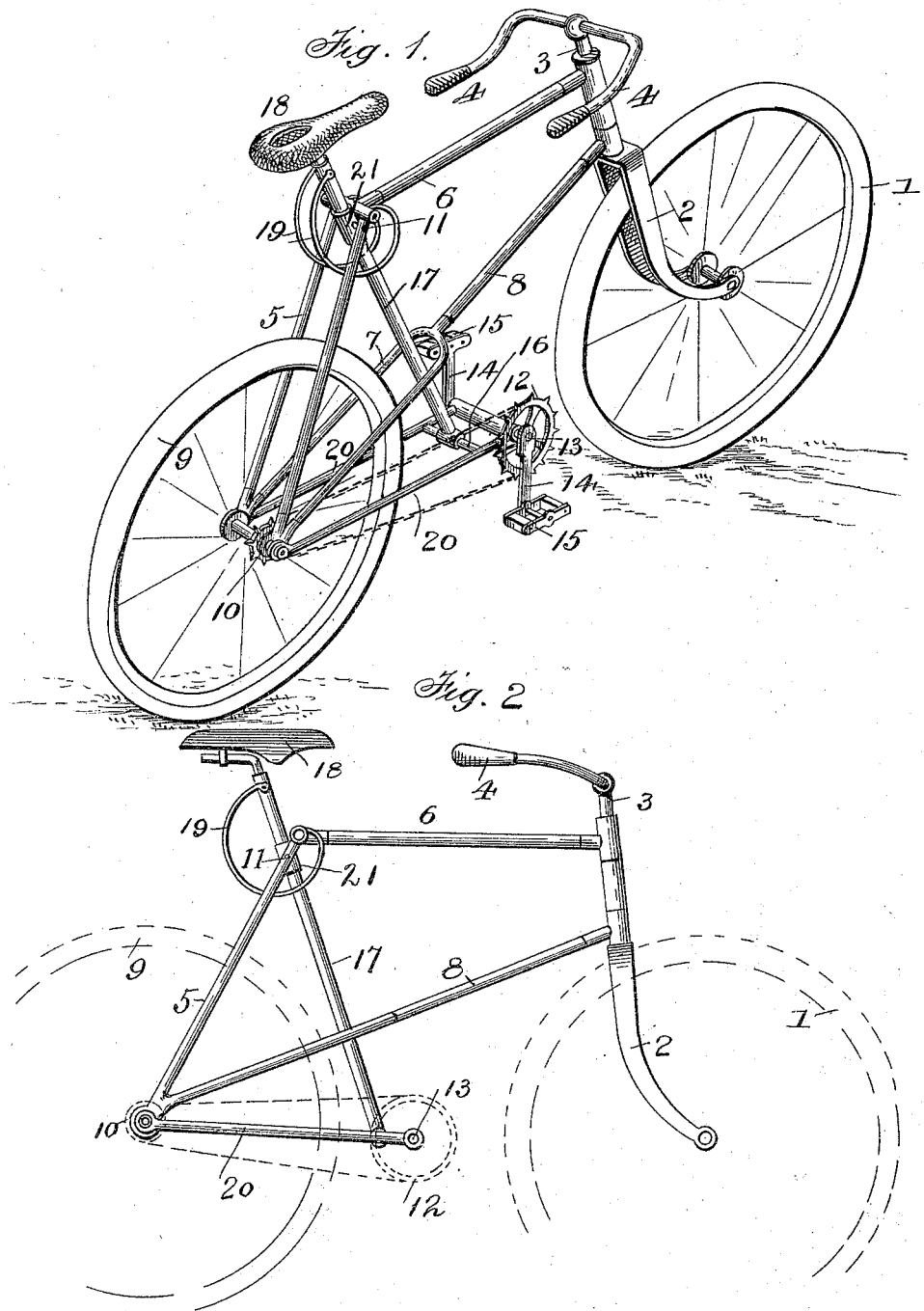

ARTHUR R. COLBURN, OF WASHINGTON, DISTRICT OF COLUMBIA.

BICYCLE.

SPECIFICATION forming part of Letters Patent No. 641,193, dated January 9, 1900.

Application filed June 15, 1896. Serial No. 595,577. (No model.)

*To all whom it may concern:*

Be it known that I, ARTHUR R. COLBURN, a citizen of the United States, and a resident of Washington, in the District of Columbia, have invented new and useful Improvements in Bicycles; and I do hereby declare the following to be a full, clear, and exact description of said invention, reference being had to the accompanying drawings, and to the figures of reference marked thereon, which form a part of this specification.

My present invention has for its object to provide a bicycle of an improved and novel construction such as to enable the main frame thereof, with the wheels journaled thereto, to rise easily over obstructions and uneven projections upon the surface of the road without the necessity of first raising the dead-weight of the rider, thus saving the rider from the shocks so received and the frame and wheels from the strain of so raising the weight of the rider, and also to provide such construction as shall possess superior advantages with respect to efficiency in operation.

To these ends my invention consists, essentially, of a bicycle having a main frame of such design as to permit and allow the free operation of the yielding auxiliary frame, as hereinafter described, for the purposes intended, and at the same time to admit of a strong, simple, and light construction connecting the front guiding fork and wheel with the rear or driving wheel, in combination with a yielding auxiliary frame carrying the seat, seat-standard, cranks, and driving-gear in such manner as to maintain the crank-axle and the rear axle, also the seat and crank-axle, always at the same distance apart and in the same relative position, while enabling the seat and pedals to have a vertically-yielding action in unison with each other, the same to be supported by a suitable spring resting upon or connected with the main frame, and the upper portion of the seat-standard being maintained in proper position laterally by a sleeve pivoted to the main frame, through which sleeve the said seat-standard passes and has freedom of motion up and down, for the purposes herein set forth, all as will be hereinafter fully described, and specifically designated in the claims.

In the accompanying drawings, Figure 1 represents a perspective view of what is known as a "safety-bicycle" constructed in accordance with my invention, and Fig. 2 a side elevation thereof.

Similar numerals of reference indicate like parts in said figures of the drawings.

Referring to said drawings, the numeral 1 designates the front wheel, journaled to the front fork 2, which is provided with the usual steering-bar 3 and handle-bars 4.

The numeral 5 designates the rear fork, connected with the front fork by the connecting-bar 6, and 7 the lower fork, connected with the front fork by the lower connecting-bar 8. The rear or driving wheel 9 is journaled to the rear ends of the said rear and lower forks and is provided with a sprocket-wheel 10, which is connected by a sprocket-chain or other suitable device with the sprocket-wheel 12 on the crank-shaft 13, which in turn is provided with cranks 14 and pedals 15 and connected to the front part of the rearwardly-extending rods 20 of the auxiliary frame.

The numeral 16 designates the lower bearing of the seat-standard shaft 17, which is suitably pivoted at the front and between the rearwardly-extending rods 20 of the auxiliary frame, which is pivotally connected with the axle of the driving-wheel at the rear ends thereof. At the upper end of the standard-shaft 17 is provided a seat or saddle 18, and said standard passes through a suitable sleeve 21, which is preferably pivoted between the upper parts of the rear fork 5 to allow of a slight oscillating movement to said shaft as the crank-shaft moves up and down in the arc of a circle. A suitable spring 19 is secured to the frame of the bicycle and supports the said movable standard with the seat and pedal-movement thereto connected as aforesaid.

The construction of my invention being as above described, it will be observed that in the operation of the same, especially when riding over rough or uneven ground, the main frame and wheels will alternately be elevated and depressed by the unevenness of the road, and the spring will cause the seat and the crank-axle bearing, moving in unison, to maintain as far as possible a uniform distance from the ground, the rods 20 of the auxiliary frame turning on the axle of the driving-wheel and the sprocket of the crank-axle moving up and down in the arc of a circle, which movement is facilitated and assisted by the pivoted bearing 11 of the sleeve 21. By these means the crank-axle and the seat will always be kept at the same distance apart, so that there will be no liability of the seat leaving the pedals, and the rear axle and the crank-axle will maintain the same distance apart to preserve an equal tension on the sprocket-chain.

It will be understood from the foregoing description that the crank-axle is separate from the lower fork and connecting-bar of the bicycle and is in no wise connected therewith or joined thereto, so that the frame is greatly strengthened, and the movable standard, with seat and pedal-movement thereto connected, is not affected by the jars to which the wheels and main frame are subjected, thus insuring safe and easy riding over a rough surface. It will also be understood that in a bicycle constructed as hereinbefore described the spring supporting the auxiliary frame is preferably hinged to the main frame near the sleeve through which passes the seat-standard, and the other end of said spring is fastened to said seat-standard. It will also be observed that the main frame is rigid, very light, and very strong by reason of its shape, being substantially triangular, so that the weight of the rider is borne almost entirely on the rear upper fork by longitudinal pressure thereon and without a transverse or breaking strain. The weight of the rider is borne upon the apex of the triangle. The auxiliary frame moves both up and down from its normal position, as shown in the drawings, through a considerable space. The seat-standard is given unyielding support as near as possible to its upper extremity, laterally, which results in several advantages, for the greater the distance from the sleeve to the seat the greater will have to be the strength and weight of the inclined seat-standard, the greater the friction upon the sleeve, and the more inconvenient the motion of the seat while the bicycle is in operation. By reason of the seat-standard being controlled in operation at two points—namely, at the sleeve and hinge—there is no change in tension upon the spring by reason of a shifting of the weight of the rider from the seat to the crank-axle. By reason of said two points of control being always a considerable space apart, notwithstanding any upward movement of the auxiliary frame, the seat-standard has a more adequate support than would otherwise be possible. If a chain be used in the driving-gear, the strain between the crank-axle and the rear axle is borne longitudinally on the lowest or radial fork, and the lower fork of the main frame is joined to the upper rear fork at a point sufficiently above the rear axle to be clear of the chain while in operation.

The construction of this bicycle is such that it is as well adaptable to the use of the bevel-gear as any other, by reason of the radial fork connecting directly the rear axle and the crank-axle.

Having thus described my invention, what I claim as new and useful is—

1. In a bicycle, the combination of the main frame, a sleeve pivoted at the apex of the frame, and a swinging and longitudinally-movable seat-standard having its upper end playing through said sleeve and guided thereby, with a rigid radial fork pivotally connected near its front end to the lower end of the seat-standard and having its bifurcations pivotally connected to the rear axle, and its front portion and suspended on the main frame by said standard; with a spring yieldingly supporting the seat-standard on the apex of the main frame, and a crank-hanger carrying the driving-gear, attached to the forward end of said radial fork, substantially as described.

2. In a bicycle, a rigid main frame, substantially as described, connecting the steering-head with the rear wheel, and a pivoted sleeve journaled in the upper part of the main frame close to the apex thereof; in combination with a yielding auxiliary frame carrying the seat and driving-gear, and consisting of the seat-standard and a lower radial fork, the upper end of said standard passing freely through said sleeve, and its lower end depending below and through the lower fork of the main frame, and hinged to the front extremity of the lower radial fork, the bifurcations of said lower radial fork having a pivotal connection with the rear axle; and a spring interposed between the apex of the main frame and the upper end of the seat-standard, all substantially as and for the purpose set forth.

3. The herein-described truss-frame for bicycles, comprising an upper rear fork, a steering-head, a top bar connected thereto, and to the upper rear fork, and a lower forked bar, one end of which is connected to the steering-head and the bifurcated portion of the bar forming the lower rear fork, said parts forming a truss-frame without central braces; with a sleeve pivoted at the apex of the frame, a seat-standard having its upper end playing through said sleeve and guided thereby, a radial fork pivotally connected to the rear axle and pivotally connected to the lower end of the seat-standard and suspended thereby, a spring attached to the apex of the truss-frame and yieldingly supporting the seat-standard thereon, and a crank-hanger carrying the driving-gear attached to the forward end of said radial fork, substantially as described.

4. In a bicycle, a rigid main frame, of substantially triangular pattern, connecting the steering-head with the rear wheel, consisting of the upper bar, the upper rear fork, the steering-head, and the lower bar and fork, and a pivoted sleeve journaled in the upper part of the upper rear fork close to the apex of the main frame; in combination with a yielding auxiliary frame carrying the seat and driving-gear, consisting of the seat-standard and lower radial fork, said standard passing freely through said sleeve and through the lower fork of the main frame, and the lower end hinged to the lower radial fork which is journaled on the rear axle; and a spring, one end thereof connected with the main frame at its apex, and the other end attached to the seat-standard, supporting said auxiliary frame and the weight of the rider, substantially as described.

In testimony whereof I affix my signature in presence of two subscribing witnesses.

ARTHUR R. COLBURN.

Witnesses:
J. WALTER COOKSEY,
ALBERT HARPER.